Jan. 20, 1931. M. M. HALL 1,789,524
SPRING TENSIONED EGG TONGS
Filed March 26, 1927

INVENTOR.
MATILDA M. HALL
BY
E. G. Charles
ATTORNEY.

Patented Jan. 20, 1931

1,789,524

UNITED STATES PATENT OFFICE

MATILDA M. HALL, OF TOPEKA, KANSAS

SPRING-TENSIONED EGG TONGS

Application filed March 26, 1927. Serial No. 178,700.

My invention relates to spring tensioned egg tongs.

The object of my invention is to provide a spring that will separate the outer or engaging ends of the tongs.

A further object of my invention is to provide a concaved member on the outer end of each arm of the tongs to receive an egg.

A still further object of my invention is to provide a simple and inexpensive means in the form of tongs to handle boiled eggs that are too warm for the finger to contact and by said means the end of the egg shell may be removed and the contents extracted by means of a spoon or the like.

These and other objects will hereinafter be more fully explained.

Referring to the drawings.

Figure 1:
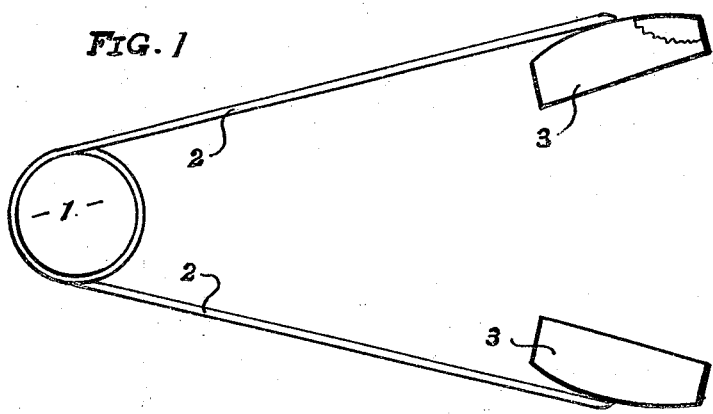
Fig. 1 is a side elevation of the tongs, parts removed for convenience of illustration.
Figure 2:
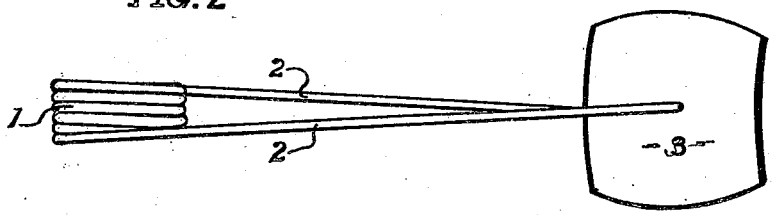
Fig. 2 is a transverse view.

The mechanism referred to consists of a single piece of wire having a spiral spring 1, centrally positioned and consisting of a plurality of coils, the ends of which tangentially extend therefrom as at 2 functioning as arms and divergently positioned, but transversely converging relative to each other as shown in Fig. 2.

Figure 3:
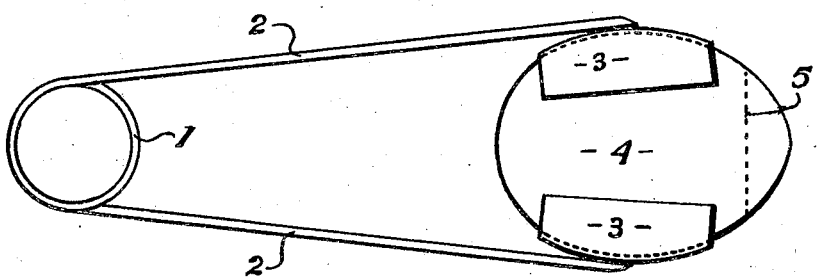
Fig. 3 is a side elevation of the tongs having an egg in the gripping elements.

On the outer ends of the arms are rigidly attached concaved members 3 to conform approximately to the shape of the minor axis of an egg as illustrated in Fig. 3, 4 being the egg.

On the outer ends of the egg is a dotted line 5 which is approximately a chosen place to sever the shell, however the line of severing may vary from near the point of the egg to the outer end of the concave member at the discretion of the participant. When said portion of the shell has been broken away the contents may be easily removed. By this arrangement eggs may be handled while in a heated condition.

As a means to prevent the tongs from turning sideways while being closed on the egg one finger of the hand may be inserted through the coil. Furthermore the coil being so made has a greater resiliency and scope of expansion at the outer end.

In the drawings I have shown the ends of the arms centrally attached to the convex side of members 3, this however, is not compulsory as they may be curved conforming to the peripheral shape of said members or they may be attached near the rear edge thereof, any of which when securely attached will function to the purpose set forth.

While the mechanism herein disclosed is described to handle hot eggs it is not confined to that alone, but may be adopted for handling baked potatoes, etc. Furthermore the mechanism is convenient for handling commodities having spherical or other forms with assurance of retaining the same within the grip of the tongs. The concave members herein shown are rectangular in contour, this however, is not compulsory as they may be disc like or other shapes. Neither do I confine the number of coils in the spring to be exactly as shown.

Such other modifications may be employed as lie within the scope of the appended claim.

Having thus described my invention, what I claim as new and desire to secure by Letters Patent is:—

In a pair of egg tongs, two concavo-convex members, a pair of wire members integral with the ends of a coil spring, said wire members supporting the said concavo-convex members at a mid-point of each, the said concavo-convex members formed to the contour of an egg, the ends of each being cut to allow the opening of an egg when held thereby.

In testimony whereof I affix my signature,
MATILDA M. HALL.